July 9, 1929.  J. H. PARMER  1,720,183
AXLE STRAIGHTENER
Filed March 19, 1928
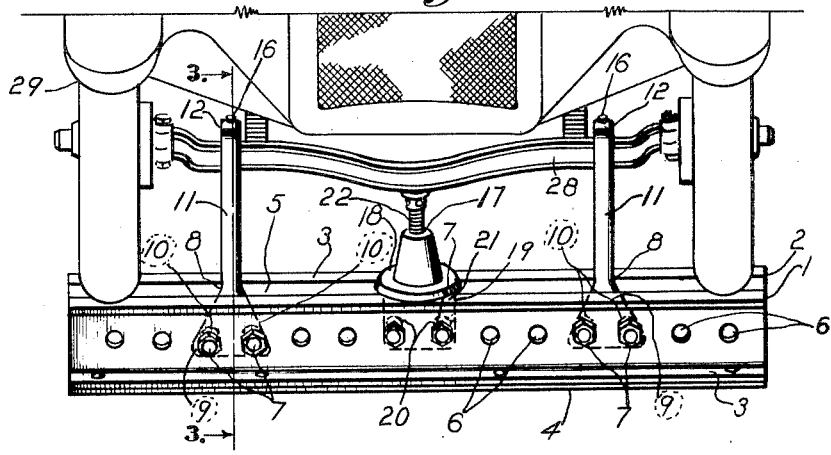
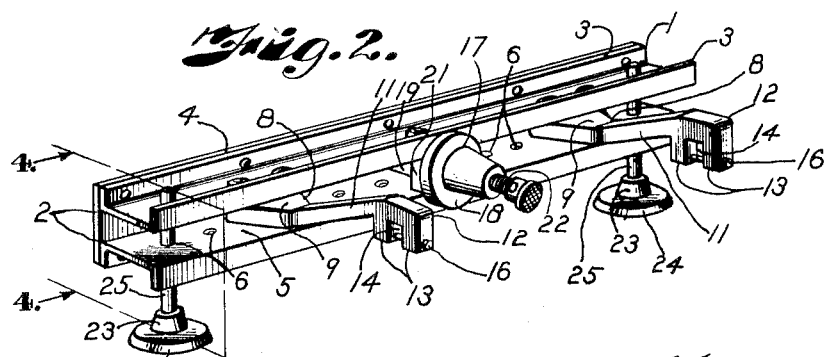
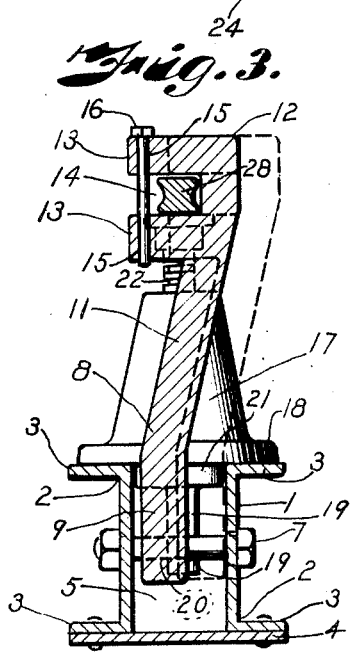
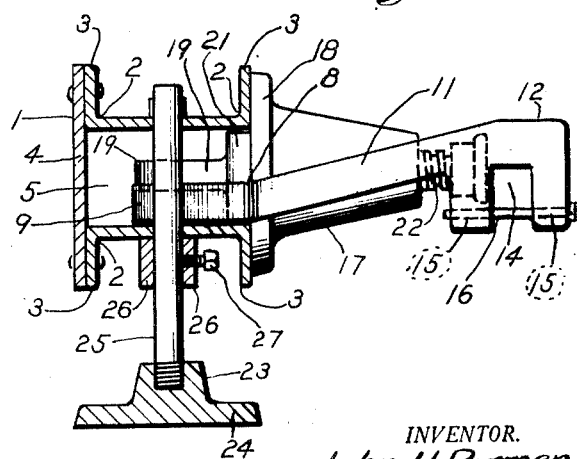
INVENTOR.
John H. Parmer
BY
ATTORNEYS.

Patented July 9, 1929.

1,720,183

UNITED STATES PATENT OFFICE.

JOHN H. PARMER, OF TULSA, OKLAHOMA.

AXLE STRAIGHTENER.

Application filed March 19, 1928. Serial No. 262,801.

My invention relates to bending devices and more particularly to devices of that character adapted for straightening the axles of motor vehicles, the principal objects of the invention being to straighten an axle without removing the same from the vehicle, to adapt a bending device for positioning in suitable relation to a wheel-engaged axle for straightening either vertical or horizontal bends, and to provide hook members of a bending device which may be easily engaged with and disengaged from an axle, whereby the time and expense incurred in restoring an axle to its proper shape may be reduced to a minimum.

In accomplishing these and other objects of the invention I have provided improved details of structure, the preferred forms of which are illustrated in the accompanying drawings, wherein:

Fig. 1 is a perspective view of the device illustrated as applied to the axle of a motor vehicle for effecting the re-shaping of the same.

Fig. 2 is a perspective view of the device mounted on supports in suitable position for engaging an automobile-supported axle and effecting horizontal alignment thereof.

Fig. 3 is a section on the line 3—3, Fig. 1.

Fig. 4 is a section on the line 4—4, Fig. 2.

Referring in detail to the drawings:

1 designates a frame or base member comprising channel rails 2 having edge flanges 3 directed outwardly, the rails being spaced in parallel relation and riveted to a bottom plate 4 to form a groove or channel 5 therebetween.

A longitudinal series of preferably equally spaced openings 6 is provided in each channel rail, the openings of one rail registering with the openings of the other, one function of the openings being to receive bolts 7 whereby the several elements later described may be mounted in the channel 5.

Axle-engaging hook members 8 are provided with triangular shaped tail portions 9 of a thickness to permit lateral shifting of the hooks between the rails, the tail portions having a plurality of openings 10 adapted for selective alignment with registering openings of the rails for insertion of bolts through the aligned rail and hook tail openings, whereby the hook tails may be engaged with the rails at a plurality of points. The hook tail openings are large enough to permit sliding of the hook members on the bolts. An arm portion 11 of each hook member extends angularly outward from the tail portion and terminates in a hook 12 comprising ears or bosses 13 vertically spaced from each other and protruding from the arm transversely to the frame, the spacing of the ears producing a square cornered opening 14 for receiving an object to be straightened. The ears are provided with vertically registering openings 15 adjacent their ends to receive a retainer pin 16 whereby an object admitted to the opening 14 may be retained therein during the straightening process.

Pressure means for the bending operation is preferably provided by a lifting jack illustrated herein as comprising a screw type jack 17 having a base 18 seatable on the rails and a depending shank or connector plate 19 secured by means such as welding to the base 18 of the jack, the plate being provided with openings 20 alignable with selected registering openings 6 of the rails to receive bolts 7 extended through the aligned openings of rails and connector plate. A guide block 21 is provided on the connector plate for slidable engagement between the rails to locate the jack centrally on the parallel rails. The stem 22 of the jack is movable against an intermediate portion of the object to be bent while the ends thereof are restrained by the hook members.

I further provide means for supporting the frame 1 in a position providing for the horizontal extension of the bending elements, for engaging an axle to effect a horizontal straightening operation, comprising footing members 23 having base flanges 24 and rod portions 25 adapted for insertion in selected openings 6 of the rails, and set collars 26 mounted on the rods and fixed thereto by set screws 27 for supporting the frame at a suitable elevation.

In operating the device for straightening vertical bends, for example, for aligning vertically the axle 28 of an automobile generally designated 29 (Fig. 1), without removing the axle from the automobile, the frame is positioned beneath the axle, or, conversely as illustrated, the wheels with which the axle is engaged are positioned upon the frame. The hook members are suitably positioned longitudinally of the frame to engage portions of the axle spaced from the part to be bent and are engaged with the frame by means of the bolts extending through the tail portions of the hook members. The hooks are slidably moved on the bolts to engage the hooks over the axle and the retainer pins are installed to lock the axle in the head, whereby the hook members serve to hold down the ends of the axle while pressure is applied for lifting and bending the engaged central portion upwardly.

The jack is suitably positioned in relation to the portion to be bent, and between the hook members, and is fixed in engagement with the frame, actuation of the jack engaging and bearing against the axle restrained by the hook members effecting the desired bending.

When the work is completed, the jack screw is loosened, the retaining pins are removed from the hook heads, and the hook members are shifted laterally on their mounting bolts to release the heads from the axle, so that the frame, and the bending elements carried thereby, may be removed.

Figs. 1 and 3 illustrate the use of the device for straightening an axle of an automobile when the wheels suitably relate the axle portions to the hook members and jack. It is apparent that adjusting means may be employed in case the heads of the hook members do not normally engage the axle of a car supported by the frame.

In Figs. 2 and 4 the use of the device for straightening horizontal bends in an axle is illustrated, the footing or supporting members 23 being inserted in suitable openings of the frame and the seating collars being adjusted to suitably elevate the frame to relate it properly with the axle and to relate the hooks and jack screw with the selected portions of the axle. The hook members are applied to the axle in a manner similar to that described for vertical bending and the jack is operated to effect the bending against the resistance of the hook members.

It is apparent that the device may be horizontally positioned either behind or in front of an axle and that the parts may be suitably related to the bend for effecting the required alignment.

What I claim and desire to secure by Letters Patent is:

1. In an axle straightening device, a support having a longitudinal groove, a jack mounted on the support to engage an axle, hook members having legs movable transversely in said groove and ears engageable with the jack-supported axle upon transverse movement of the hook members, and means for engaging the hook members and jack with the support.

2. In an axle straightening device including a support having a longitudinal groove, hook members having legs movable longitudinally and transversely in said groove and axle-engaging ears, a jack seatable on said support and having a shank movable in said groove, and means for engaging the legs of the hook members and the shank of the jack with the support.

3. In a bending device, a base, hook members, means for supporting each of the hook members at a plurality of points on said base, a jack adapted for support by the bars to engage an object to be bent, the hook members being movable transversely of said base on the supports and provided with ears extending transversely of the base to engage said object to be bent, and means removably securing the jack to the base.

4. In a bending device, a base, supporting members extending transversely of the base, spaced hook members each engaged at a plurality of points with selected supporting members and movable transversely of the base thereon, said hook members being provided with ears extending transversely of the base member for engaging an object to be bent where the hook members are moved transversely, and a jack adapted for retention by selected supporting members in functional relation with said hook members.

5. In an axle straightening device, a support comprising a base plate and spaced rails fixed thereto, the rails having registering openings, axle-engaging hook members having legs for positioning between the rails, each leg being provided with a plurality of openings alignable with selected registering rail openings, the legs being movable transversely between the rails, an axle-engaging jack seatable on the rails and having a shank portion receivable between said rails and provided with openings, and means for fixing the hook members and the jack to the support including bolts extensible through registering openings.

6. In an axle straightening device, a support comprising a base plate and spaced parallel rails fixed thereto, the rails having registering openings, hook members having legs provided with a plurality of bolt-receiving openings whereby bolts may be extended through rail openings and hook openings to support the hook members, the hook members being slidable on said bolts transversely of the support and having means for engaging an axle when moved transversely of the support, an axle-engaging jack seatable on the rails and having a shank portion receivable between said rails and provided with bolt-receiving openings, and footing members comprising stems insertable in selected openings of said rails and seating members adjustably fixed thereto for supporting the support from said footing members.

7. In an axle straightening device, a support comprising a base, axle-engaging hook members, means for engaging the hook members with the base, an axle-engaging jack, means for engaging the jack with the base, footing members having stems movable through the base, and seating members mounted on the footing members for supporting the base from said footing members.

8. In an axle straightener including a base and axle-engaging members including a hook and a jack, footing members having stems movable through the base, and seating members mounted on the footing members for supporting the base from said footing members.

In testimony whereof I affix my signature.

JOHN H. PARMER.